(12) United States Patent
Ku et al.

(10) Patent No.: US 11,275,965 B2
(45) Date of Patent: Mar. 15, 2022

(54) METHOD FOR GENERATION OF AN AUGMENTED POINT CLOUD WITH POINT FEATURES FROM AGGREGATED TEMPORAL 3D COORDINATE DATA, AND RELATED DEVICE

(71) Applicants: Jason Philip Ku, Toronto (CA); Elmira Amirloo Abolfathi, North York (CA); Mohsen Rohani, Gatineau (CA)

(72) Inventors: Jason Philip Ku, Toronto (CA); Elmira Amirloo Abolfathi, North York (CA); Mohsen Rohani, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/840,319

(22) Filed: Apr. 3, 2020

(65) Prior Publication Data

US 2021/0312225 A1 Oct. 7, 2021

(51) Int. Cl.
*G06K 9/62* (2006.01)
*G06K 9/00* (2006.01)
*G06N 3/02* (2006.01)

(52) U.S. Cl.
CPC ........ *G06K 9/6211* (2013.01); *G06K 9/00791* (2013.01); *G06K 9/6221* (2013.01); *G06K 9/6272* (2013.01); *G06N 3/02* (2013.01)

(58) Field of Classification Search
CPC ............. G06K 9/6211; G06K 9/00791; G06K 9/6221; G06K 9/6272; G06N 3/02
See application file for complete search history.

(56) References Cited

U.S. PATENT DOCUMENTS

2017/0287216 A1 10/2017 Kim
2018/0313940 A1* 11/2018 Wu .................. G05D 1/0246

FOREIGN PATENT DOCUMENTS

CN 108152831 A 6/2018
CN 108229366 A 6/2018
CN 108647646 A 10/2018
(Continued)

OTHER PUBLICATIONS

Liang, Ming, et al. "Multi-Task Multi-Sensor Fusion for 3D Object Detection." Proceedings of the IEEE Conference on Computer Vision and Pattern Recognition. 2019.
(Continued)

*Primary Examiner* — David F Dunphy (57) ABSTRACT

A method for generation of an augmented point cloud with point features from aggregated 3D coordinate data and related device. The method comprises receiving a current point cloud in the form of 3D coordinate data in ego coordinates from one or more detection and ranging (DAR) devices of a vehicle. Features are extracted from the current point cloud. A previous point cloud is transformed into ego coordinates using a current location of the vehicle. Each point in the previous point cloud is transformed to align with a corresponding point in the current point cloud to generate a transformed point cloud. The current point cloud is aggregated with the transformed point cloud to generate an aggregated point cloud. The current point features are aggregated with the point features of the transformed point cloud to generate aggregated point features.

18 Claims, 6 Drawing Sheets

(56) References Cited

FOREIGN PATENT DOCUMENTS

CN 110197223 A 9/2019

OTHER PUBLICATIONS

Luo, Wenjie, Bin Yang, and Raquel Urtasun. "Fast and furious: Real time end-to-end 3d detection, tracking and motion forecasting with a single convolutional net." Proceedings of the IEEE conference on Computer Vision and Pattern Recognition. 2018.

Ku, Jason, et al. "Joint 3d proposal generation and object detection from view aggregation." 2018 IEEE/RSJ International Conference on Intelligent Robots and Systems (IROS). IEEE. 2018.

Jiang, Cansen, et al. "Dynamic 3d scene reconstruction and enhancement." International Conference on Image Analysis and Processing. Springer, Cham. 2017.

Shi, Shaoshuai, Xiaogang Wang, and Hongsheng Li. "Pointrcnn: 3d object proposal generation and detection from point cloud." Proceedings of the IEEE Conference on Computer Vision and Pattern Recognition. 2019.

Yang, Zetong, et al. "STD: Sparse-to-Dense 3D Object Detector for Point Cloud." ICCV. 2019.

Casas, Sergio, Wenjie Luo, and Raquel Urtasun. "Intentnet: Learning to predict intention from raw sensor data." Conference on Robot Learning. 2018.

Caesar, Holger, et al. "nuScenes: A multimodal dataset for autonomous driving." arXiv preprint arXiv:1903.11027. 2019.

Lang, Alex H., et al. "PointPillars: Fast encoders for object detection from point clouds." Proceedings of the IEEE Conference on Computer Vision and Pattern Recognition. 2019.

Charles R. Qi, Hao Su, Kaichun Mo, Leonidas J. Guibas, "PointNet: Deep Learning on Point Sets for 3D Classification and Segmentation", CVPR 2017, Apr. 10, 2017, pp. 652-660 2017.

Wenwei Zhang, Hui Zhou, Shuyang Sun, Zhe Wang, Jianping Shi, Chen Change Loy, "Robust Multi-Modality Multi-Object Tracking", ICCV 2019, Sep. 9, 2019, pp. 2365-2374 2019.

Xingyu Liu, Charles R. Qi, Leonidas J. Guibas, "FlowNet3D: Learning Scene Flow in 3D Point Clouds", CVPR 2019, Jul. 21, 2019, pp. 529-537 2019.

Charles R. Qi, Li Yi, Hao Su, Leonidas J. Guibas, "PointNet++: Deep Hierarchical Feature Learning on Point Sets in a Metric Space", Conference on Neural Information Processing Systems (NIPS) 2017, Jun. 7, 2017, 14 pages 2017.

B. Sahbani and W. Adiprawita, "Kalman filter and Iterative-Hungarian Algorithm implementation for low complexity point tracking as part of fast multiple object tracking system," 2016 6th International Conference on System Engineering and Technology (ICSET), Bandung, 2016, pp. 109-115 2016.

\* cited by examiner

METHOD FOR GENERATION OF AN AUGMENTED POINT CLOUD WITH POINT FEATURES FROM AGGREGATED TEMPORAL 3D COORDINATE DATA, AND RELATED DEVICE

TECHNICAL FIELD

The present disclosure relates to computer perception, and in particular, to a method for generation of an augmented point cloud with point features from aggregated temporal 3D coordinate data, and related device.

BACKGROUND

Detection and ranging (DAR) devices such as LiDAR (Light Detection and Ranging) and radar are used to generate point clouds which may be used for a variety of purposes, for example, by a computer vision and perception systems. A point cloud is a set of data points in a coordinate system, typically a three-dimensional (3D) coordinate system. Each data point in the point cloud has three (3) coordinates, namely x, y, and z coordinates, which determine where the data point is located along x, y, and z axes of the 3D coordinate system respectively. Computer perception systems typically process 3D coordinate data a single frame at a time. A typical perception pipeline consists of a DAR device performing a single sweep (or scan) of the environment to generate a 3D coordinate data representing the environment at that point in time. The 3D coordinate data is then passed to various modules of the computer perception system such as tracking, motion prediction, and planning modules.

SUMMARY

The present disclosure describes a method for generation of a densified (also known as aggregated) temporal point cloud, a method for generation of an augmented point cloud with point features from a densified or aggregated point cloud, related computing devices and non-transitory machine readable media.

In accordance with the method for generation of a densified temporal point cloud, a DAR device is used to generate a current point cloud at a current time step. The current point cloud is densified by aggregating the current point cloud with previous point points to densify both static and dynamic objects. This may result in improved 3D coordinate data for point clouds as compared to the sparse 3D coordinate data output by typical DAR devices which may limit the range of computer vision and/or perception methods, especially at farther distances. The aggregation is performed directly with 3D coordinate data without quantization or voxelization. The aggregated point cloud may include representations of both static and dynamic objects of interest, and densify object point clouds for static and dynamic objects. A machine learning-based system such as a neural network may be incorporated into the perception pipeline to determine a transformation to align between points from a previous time step into the current time step. By applying the transformation, the previous points may be aggregated into the same 3D space at the current time. Further, the aggregation of points using data from DAR scans is believed to be more accurate than alternative approaches to densification such as depth completion.

In accordance with the method for generation of an augmented point cloud with point features from aggregated 3D coordinate data, a DAR device is used to generate a current point cloud at a current time step. The current point cloud is densified by aggregating the current point cloud with previous point points and corresponding point features to densify both static and dynamic objects. This may result in improved 3D coordinate data as compared to sparse 3D coordinate data output by typical DAR devices which may limit the range of computer vision and/or perception methods, especially at farther distances. The aggregation is performed directly with 3D coordinate data without quantization or voxelization. The aggregated point clouds may include representations of both static and dynamic objects of interest, and densify object point clouds for static and dynamic objects. A machine learning-based system such as a neural network may be incorporated into the perception pipeline to determine a transformation to align between points from a previous time step into the current time step. By applying the determined transformation, the previous points and point features may be aggregated into the same 3D space at the current time. Further, by determining point transformations to the current time step and maintaining previously computed point features for efficiency, this design allows for more efficient re-use of previously observed point clouds and previously perceived (i.e., computed or determined) point features across time, as point features do not need to be recalculated for a given time step if the features are already saved in the augmented instance list, thereby reducing computation. Point features in the current point cloud are only determined when the 3D coordinate data does not match previously computed point features. Further still, the aggregation of points using data from DAR scans is believed to be more accurate than alternative approaches to densification such as depth completion.

The aggregated points and/or features may be saved in a dynamically updated list of tracked instances, creating augmented instance representations of object instances which include information collected from previous viewpoints, better representing each object. The augmented instance representations include 3D coordinate data and point features which represent previous information and includes data from previous viewpoints. The augmented instance representations may also be used for other modules or tasks, and may provide better signal for other perception modules or tasks. For example, the augmented instance representations (or augmented point cloud) may be output to various modules of a computer vision and/or perception system such as tracking, motion prediction, and planning modules. The densified point cloud may also be useful for point cloud application algorithms that require high resolution and/or high accuracy point clouds to function effectively such as, for example, 3D detection.

The method is designed for efficient computation based on point data without quantization or voxelization by re-using previously computed features, and is meant to be run in real-time on a sequence of point cloud inputs from a DAR device, for example, for autonomous driving.

In accordance with a first aspect of the present disclosure, there is provided a method of generating an aggregated 3D coordinate data. A current point cloud in the form of 3D coordinate data in ego coordinates is captured by one or more detection and ranging (DAR) devices of a vehicle when the vehicle is operating in an environment and received by a processing system of a host device. A previous point cloud is transformed into ego coordinates using a current location of the vehicle. Each point in the previous point cloud is transformed to align with a corresponding point in the current point cloud to generate a transformed point cloud. The current point cloud is aggregated with the transformed point cloud to generate an aggregated point cloud for the aggregated point cloud.

In some or all examples of the method of the first aspect, the method further comprises: generating a reduced aggregated point cloud by selectively removing a set of the points from the aggregated point cloud based on a weighted scoring of each point in the aggregated point cloud.

In some or all examples of the method of the first aspect, generating the reduced aggregated point cloud comprises: assigning the weighted scoring of each point in the aggregated point cloud based on a time at which the respective point was initially detected and a time decay function that reduces the assigned weight based on a time lapsed since the respective point was initially detected; and removing points in the aggregated point cloud having a weighted scoring below a threshold.

In some or all examples of the method of the first aspect, generating the reduced aggregated point cloud comprises: assigning the weighted scoring of each point in the aggregated point cloud based on a distance from a centre of the origin of the aggregated point cloud and a decay function that reduces the assigned weight based on the distance from the centre of the origin of the aggregated point cloud; and removing points in the aggregated point cloud having a weighted scoring below a threshold.

In some or all examples of the method of the first aspect, the method further comprises: removing point features corresponding to the set of the points selectively removed from the aggregated point cloud from the aggregated point features.

In some or all examples of the method of the first aspect, transforming each point in the previous point cloud to align with a corresponding point in the current point cloud to generate the transformed point cloud is performed by a neural network.

In some or all examples of the method of the first aspect, the method further comprises: determining an association between point features in the current point cloud and point features in the previous point cloud.

In some or all examples of the method of the first aspect, the method further comprise: updating one or more tracked instances using the aggregated point cloud and aggregated point features using the association between point features in the current point cloud and point features in the previous point cloud.

In some or all examples of the method of the first aspect, determining the association between point features in the current point cloud and point features in the previous point cloud is based on a Kalman Filter with Hungarian Algorithm.

In some or all examples of the method of the first aspect, each tracked instance comprises the following instance information: a 3D shape, a classification class, 3D coordinate data, point features, a trajectory and a tracking history.

In some or all examples of the method of the first aspect, the method further comprises determining a transformation to transform each point in the previous point cloud to align with a corresponding point in the current point cloud to generate a transformed point cloud. In some or all examples of the method of the first aspect, the determining is performed by a neural network.

In some or all examples of the method of the first aspect, extracting features from the current point cloud is performed by a neural network.

In some or all examples of the method of the first aspect, the previous point cloud has a larger dimension that the current point cloud.

In some or all examples of the method of the first aspect, the current location of the vehicle is determined by a satellite receiver of the vehicle.

In accordance with second aspect of the present disclosure, there is provided a method for generation of an augmented point cloud and related device.

The method comprises receiving a current point cloud in the form of 3D coordinate data in ego coordinates captured by one or more detection and ranging (DAR) devices of a vehicle when the vehicle is operating in an environment and received by a processing system of a host device. Each point in the previous point cloud is transformed to align with a corresponding point in the current point cloud to generate a transformed point cloud. The current point cloud is aggregated with the transformed point cloud to generate an aggregated point cloud.

In some or all examples of the method of the second aspect, the method further comprises generating a reduced aggregated point cloud by selectively removing a set of the points from the aggregated point cloud based on a weighted scoring of each point in the aggregated point cloud.

In some or all examples of the method of the second aspect, generating the reduced aggregated point cloud comprises assigning the weighted scoring of each point in the aggregated point cloud based on a time at which the respective point was initially detected and a time decay function that reduces the assigned weight based on a time lapsed since the respective point was initially detected; and removing points in the aggregated point cloud having a weighted scoring below a threshold.

In some or all examples of the method of the second aspect, generating the reduced aggregated point cloud comprises: assigning the weighted scoring of each point in the aggregated point cloud based on a distance from a centre of the origin of the aggregated point cloud and a decay function that reduces the assigned weight based on the distance from the centre of the origin of the aggregated point cloud; and removing points in the aggregated point cloud having a weighted scoring below a threshold.

In some or all examples of the method of the second aspect, transforming each point in the previous point cloud to align with a corresponding point in the current point cloud to generate the transformed point cloud is performed by a neural network.

In some or all examples of the method of the second aspect, the method further comprises determining a transformation to transform each point in the previous point cloud to align with a corresponding point in the current point cloud to generate a transformed point cloud. In some or all examples of the method of the second aspect, the determining is performed by a neural network.

In some or all examples of the method of the second aspect, extracting features from the current point cloud is performed by a neural network.

In some or all examples of the method of the second aspect, the previous point cloud has a larger dimension that the current point cloud.

In some or all examples of the method of the second aspect, the current location of the vehicle is determined by a satellite receiver of the vehicle.

In accordance with a further aspect of the present disclosure, there is provided a processing system comprising a processing unit and a memory, the memory having tangibly stored thereon executable instructions that, in response to execution by the processor unit, cause the to perform the methods described above and herein. The processing system may be part of a vehicle control system for a vehicle or a computer perception system of a vehicle control system that is configured to perform the methods described above and herein.

In accordance with a further aspect of the present disclosure, there is provided a vehicle comprising a mechanical system for moving the vehicle, a drive control system coupled to the mechanical system for controlling the mechanical system and a vehicle control system coupled to the drive control system. The vehicle control system may comprise a computer vision and/or perception system. The vehicle control system or computer vision and/or perception system, as the host device, is configured to perform the methods described above and herein.

In accordance with a further aspect of the present disclosure, there is provided a non-transitory machine readable medium having tangibly stored thereon executable instructions for execution by a processor system. The executable instructions, in response to execution by the processor system, cause the processor system to perform the methods described above and herein.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in mobile robot vehicles including, but not limited to, autonomous vacuum cleaners, rovers, lawn mowers, unmanned aerial vehicle (UAV), and other objects.

Figure 1:
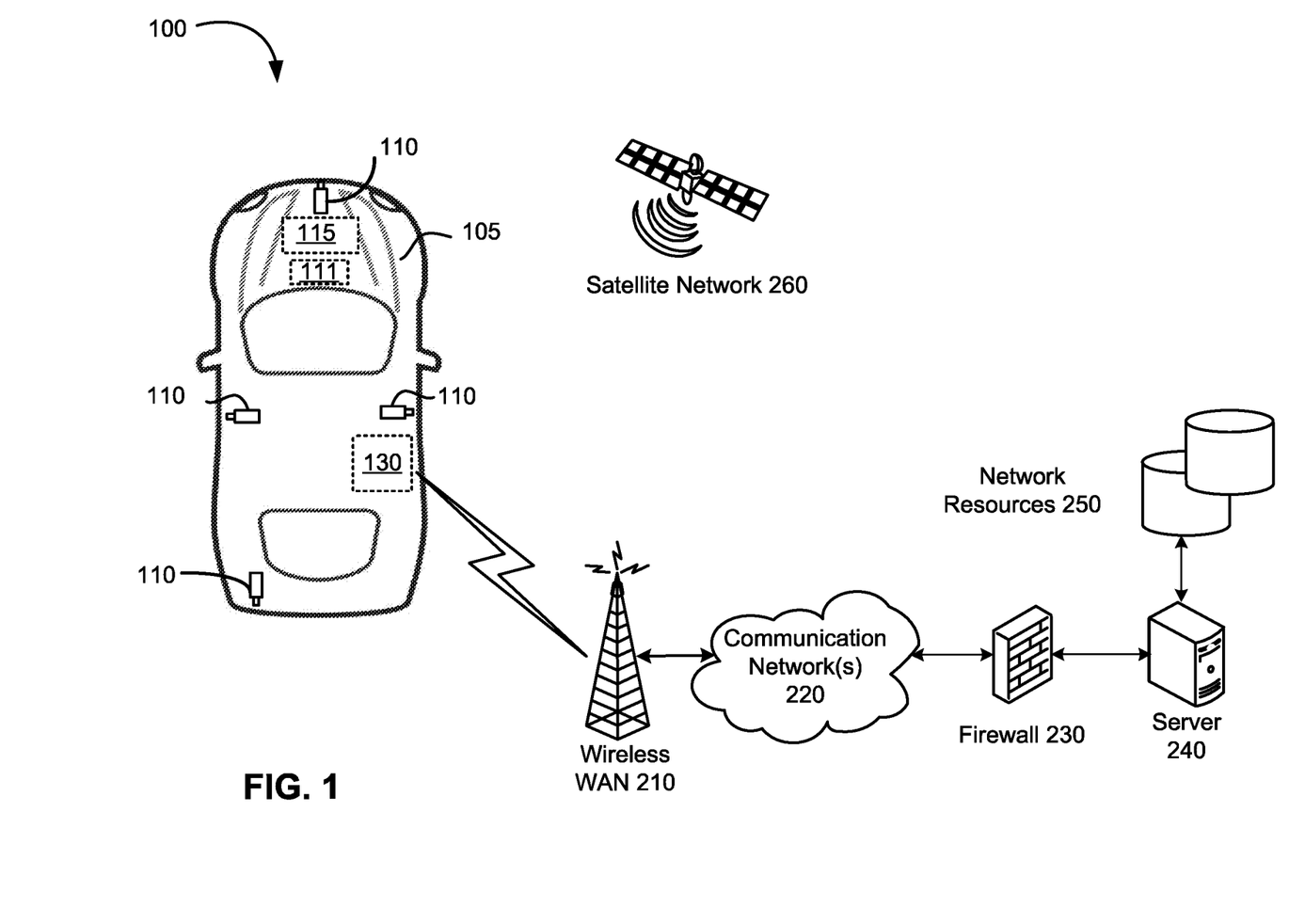
FIG. 1 is a schematic diagram of a communication system suitable for practicing example embodiments of the present disclosure.
Figure 2:
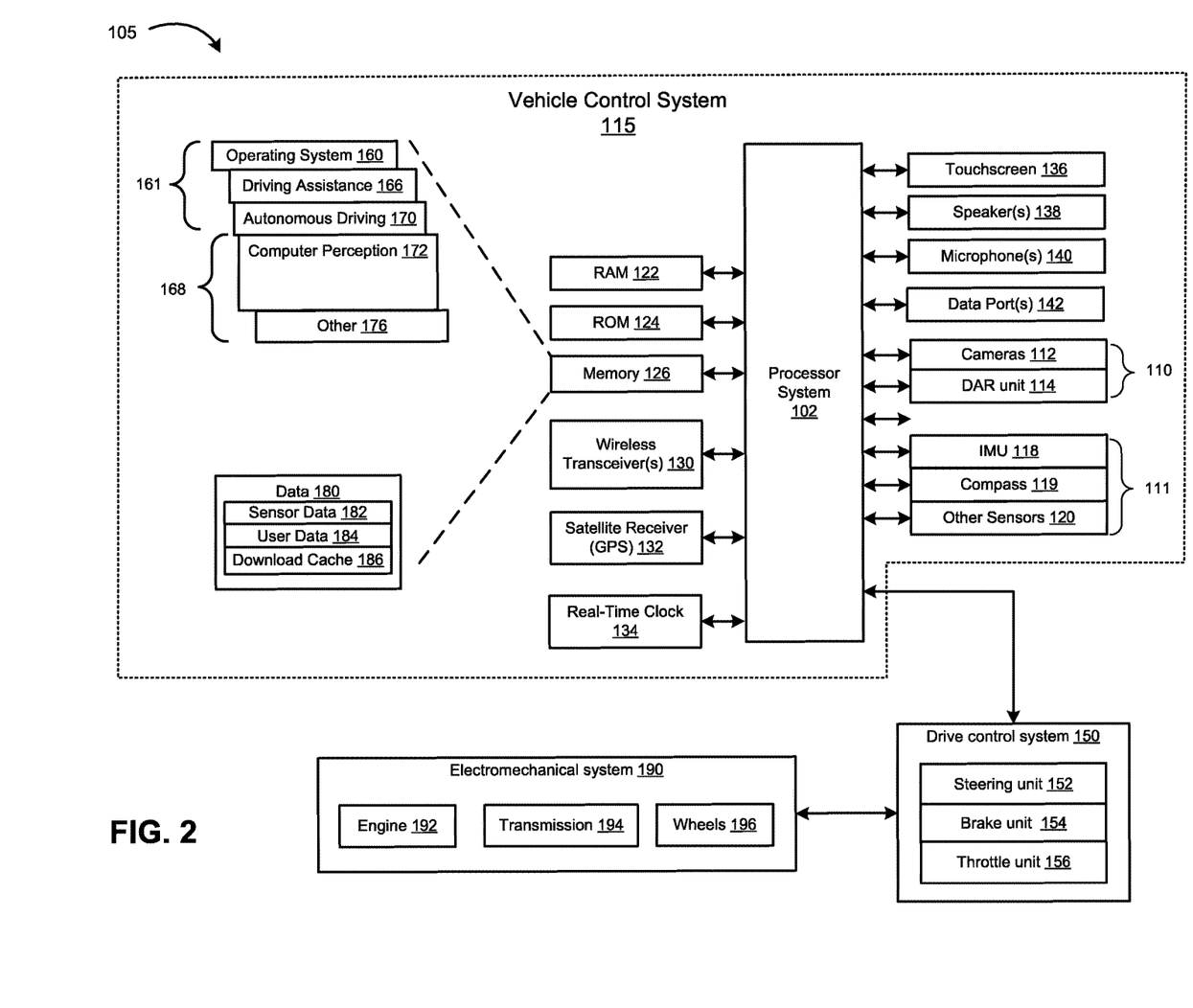
FIG. 2 is a block diagram of a vehicle comprising a vehicle control system in accordance with one example embodiment of the present disclosure.

FIG. 1 is a schematic diagram showing selected components of a communication system 100 in accordance with one example embodiment of the present disclosure. The communication system 100 comprises user equipment in the form of a vehicle control system 115 embedded in a vehicle 105. The vehicle control system 115, shown in greater detail in FIG. 2, is coupled to a drive control system 150 and a mechanical system 190 of the vehicle 105, as described below.

The vehicle control system 115 may in various embodiments allow the vehicle 105 to be operable in one or more of a fully-autonomous, semi-autonomous or fully user-controlled mode.

The vehicle 105 includes a plurality of electromagnetic (EM) wave based sensors 110 that collect data about the external environment surrounding the vehicle 105, and a plurality of vehicle sensors 111 that collect data about the operating conditions of the vehicle 105. The EM wave based sensors 110 may, for example, include one or more cameras 112 and one or more DAR units 114. The DAR units 114 may comprise one or more LiDAR units 114 and/or one or more radar units (e.g., synthetic aperture radar (SAR) units). The digital cameras 112 and DAR units 114 are located about the vehicle 105 and are each coupled to the vehicle control system 115, as described below. In an example embodiment, the cameras 112 and DAR units 114 are located at the front, rear, left side and right side of the vehicle 105 to capture data about the environment in front, rear, left side and right side of the vehicle 105. For each type of EM wave based sensor 110, individual units are mounted or otherwise located to have different fields of view (FOVs) or coverage areas to capture data about the environment surrounding the vehicle 105. In some examples, for each type of EM wave based sensor 110, the FOVs or coverage areas of some or all of the adjacent EM wave based sensors 110 are partially overlapping. Accordingly, the vehicle control system 115 receives data about the external environment of the vehicle 105 as collected by cameras 112 and DAR units 114.

Vehicle sensors 111 may include an inertial measurement unit (IMU) 118 that senses the vehicle's specific force and angular rate using a combination of accelerometers and gyroscopes, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense the environment and provide sensor data based on environmental conditions to the vehicle control system 115 in real-time or near real-time. The vehicle control system 115 may collect data about a position and orientation of the vehicle 105 using signals received from a satellite receiver ("GPS unit") 132 and the IMU 118. The vehicle control system 115 may determine a linear speed, angular speed, acceleration, engine RPMs, transmission gear and tire grip of the vehicle 105, among other factors, using data from one or more of the satellite receivers 132, the IMU 118, and other vehicle sensors 120.

The vehicle control system 115 may also comprise one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The communication system 100 comprises a satellite network 260 comprising a plurality of satellites in addition to the wireless WAN 210. The vehicle control system 115 comprises the satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

FIG. 2 illustrates selected components of the vehicle 105 in accordance with an example embodiment of the present disclosure. As noted above, the vehicle 105 comprises a vehicle control system 115 that is connected to a drive control system 150 and a mechanical system 190 as well as to the EM wave based sensors 110 and the vehicle sensors 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with the wireless WAN 210, a satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs), one or more tensor processing units (TPUs), and other processing units.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 134 may comprise a crystal oscillator that provides accurate real-time time data. The time data may be periodically adjusted based on time data received through satellite receiver 132 or based on time data received from network resources 250 executing a network time protocol.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor system 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The vehicle control system 115 may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system 170 (for autonomous driving mode) or a driving assistance system 166 (for semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor system 102. A user may interact with the GUI using the touchscreen 136 and optionally other input devices (e.g., buttons, dials) to select a driving mode for the vehicle 105 (e.g., fully autonomous driving mode or semi-autonomous driving mode) and to display relevant data and/or information, such as navigation information, driving information, parking information, media player information, climate control information, etc. The GUI may comprise a series of traversable content-specific menus.

The memory 126 of the vehicle control system 115 has stored thereon a plurality of software systems 161 in addition to the GUI, each software system 161 including instructions that may be executed by the processor system 102. The software systems 161 include an operating system 160, the driving assistance system 166 for semi-autonomous driving, and the autonomous driving system 170 for fully autonomous driving. Both the driving assistance system 166 and the autonomous driving system 170 may include one or more of a navigation planning and control module, a vehicle localization module, parking assistance module, and autonomous parking module. The memory 126 also has stored thereon software modules 168 that may be invoked by either the driving assistance system 166 or the autonomous driving system 170. The software modules 168 include a computer perception module 172. The computer perception module 172 is a software system that comprises a learning-based pre-processing module 330 or 530, a point cloud processing module 340 or 540, and optionally a cost determining module 360 or 560. Other modules 176 include for example a mapping module, a navigation module, a climate control module, a media player module, a telephone module and a messaging module. The computer perception module 172, when executed by the processor system 102, causes the operations of the methods described herein to be performed.

Although the computer perception module 172 is shown as a separate module that may be invoked by the driving assistance system 166 for semi-autonomous driving and/or the autonomous driving system 170, one or more of the software modules 168, including the computer perception module 172, may be combined with one or more of the other modules 176 in some embodiments.

The memory 126 also stores a variety of data 180. The data 180 may comprise sensor data 182 received from the EM wave based sensors 110, user data 184 comprising user preferences, settings and optionally personal media files (e.g., music, videos, directions, etc.), and a download cache 186 comprising data downloaded via the wireless transceivers 130 including, for example, data downloaded from network resources 250. The sensor data 182 may comprise image data from the cameras 112, 3D coordinate data from the DAR units 114 or from the SAR units 116, IMU data from the IMU 118, compass data from the electronic compass 119, and other sensor data from other vehicle sensors 120. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data and/or information. Data received by the vehicle control system 115 may also be stored in the RAM 122. Although specific functions are described for various types of memory, this is merely one example, and a different assignment of functions to types of memory may also be used.

Generating a Densified (or Aggregated) Temporal 3D Coordinate Data

Figure 3:
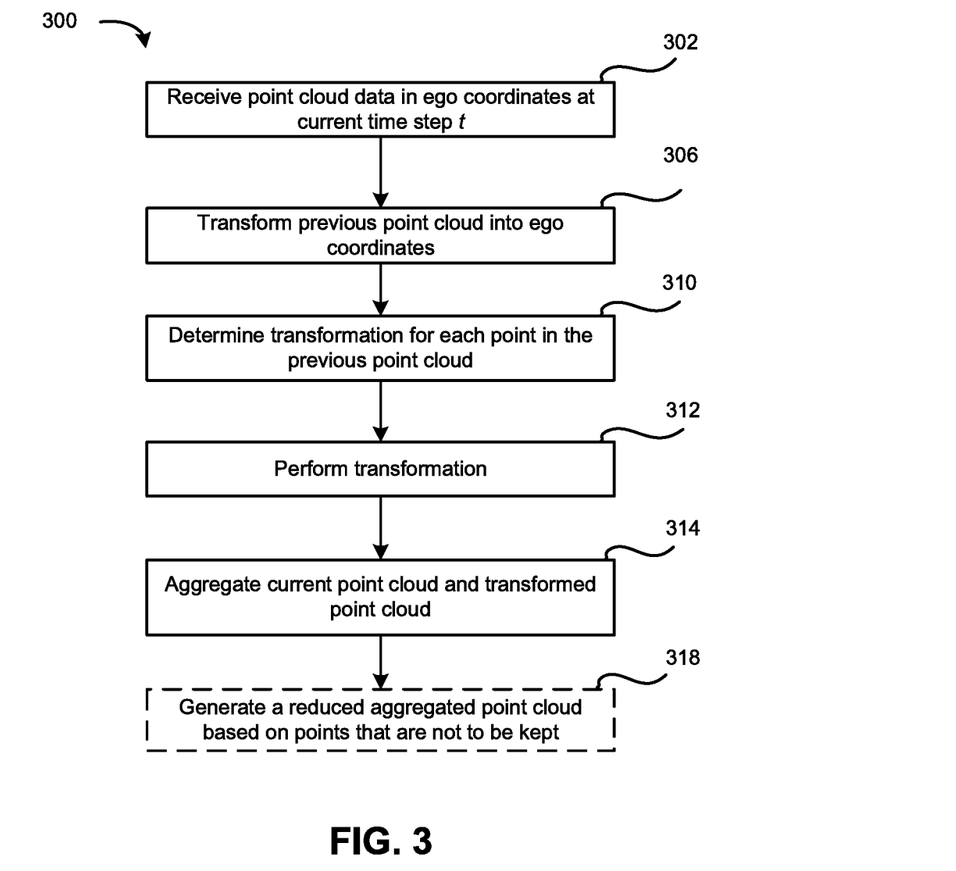
FIG. 3 is a flowchart of a method of generating a densified (or aggregated) temporal 3D coordinate data in accordance with one example embodiment of the present disclosure.

Referring to FIG. 3, a method 300 of generating a densified (or aggregated) temporal 3D coordinate data in accordance with one example embodiment of the present disclosure. The method 300 may be carried out by software (e.g., the computer perception system 172) executed by the processor system 102 of the vehicle control system 115.

At action 302, the processor system 102 receives a current point cloud in the form of 3D coordinate data from the one or more DAR units 114 at a current time step t. The current point cloud is framed in ego coordinates. Ego coordinates are coordinates of a 3D coordinate system in which the center of gravity of the vehicle 105 is located at the origin. The current point cloud has dimensions W×H×D, wherein W is width, H is height and D is depth. The current 3D coordinate data that represents the current point cloud is stored at least temporarily in memory, such as the memory 126.

At action 306, the processor system 102 transforms a previously generated point cloud (referred to as the "previous point cloud" for convenience), such as a previously aggregated point cloud from a previous time step t−1, into ego coordinates using the current location of the vehicle 105, which may be determined from the GPS unit 132, self-localization, or other suitable means. The previous point cloud may have different dimensions than the current point cloud. For example, if the previous point cloud is a previously aggregated point cloud, the previously aggregated point cloud may have a larger dimension that the current point cloud because the previously aggregated point cloud may include points outside the range of the DAR unit 114 when the current point cloud was generated.

At action 310, the processing system 102 determines a transformation for each point in the previous point cloud to align the point in the previous point cloud with a corresponding point in the current point cloud. The determined transformation may be performed by a machine learning-based system such as a neural network or may be performed programmatically using a set of one or more pre-programmed algorithms.

In some embodiments, the transformation for each point in the previous point cloud may be determined based on 3D tracking labels which are assigned to objects detected (e.g., recognized) within the previous point cloud using feature recognition techniques. Using feature recognition techniques, a 3D shape may be defined for each object detected within a point cloud for a given time step. The object for 3D shape is stored at least temporarily in memory 126 and provides 3D shape information for the respective 3D shape. The 3D shape may be a unique shape representing an approximation of the 3D shape of the detected object. Alternatively, the 3D shape may be a 3D bounding box to simplify the determination of the transformation. The 3D shape information defined for objects detected in a previous point cloud in a previous time step may be persisted over subsequent time steps for reuse, for example, in the determination of the transformation for each point in the previous point cloud and possibly other uses.

In each time step, the 3D shape defined for each previously detected object is identified and the location of each 3D shape in the point cloud at each time step is determined. A centroid or centre of each 3D shape may be calculated or otherwise determined using feature or shape recognition techniques and stored in memory with the 3D shape information. The centroid or centre may be used as a reference location for transformation operations. Using the reference location (e.g., centroid) the position of the 3D object may be tracked over multiple time steps. The 3D shape and change in location of the centroid may be used to determine a transformation for each 3D object in the point cloud. An example of a suitable neural network configured for determining a transformation for each point in a previous point cloud based on 3D tracking labels is the FlowNet3D architecture, described in the paper Xingyu Liu, Charles R. Qi, Leonidas J. Guibas, "FlowNet3D: Learning Scene Flow in 3D Point Clouds", CVPR 2019, 21 Jul. 2019, pages 529-537, and the paper Charles R. Qi, Li Yi, Hao Su, Leonidas J. Guibas, "PointNet++: Deep Hierarchical Feature Learning on Point Sets in a Metric Space", Conference on Neural Information Processing Systems (NIPS) 2017, 7 Jun. 2017, 14 pages, the content of these papers being incorporated herein by reference.

At action 312, the processing system 102 transforms the previous point cloud is transformed in accordance with the determined transformation to generate a transformed point cloud.

Figure 5:
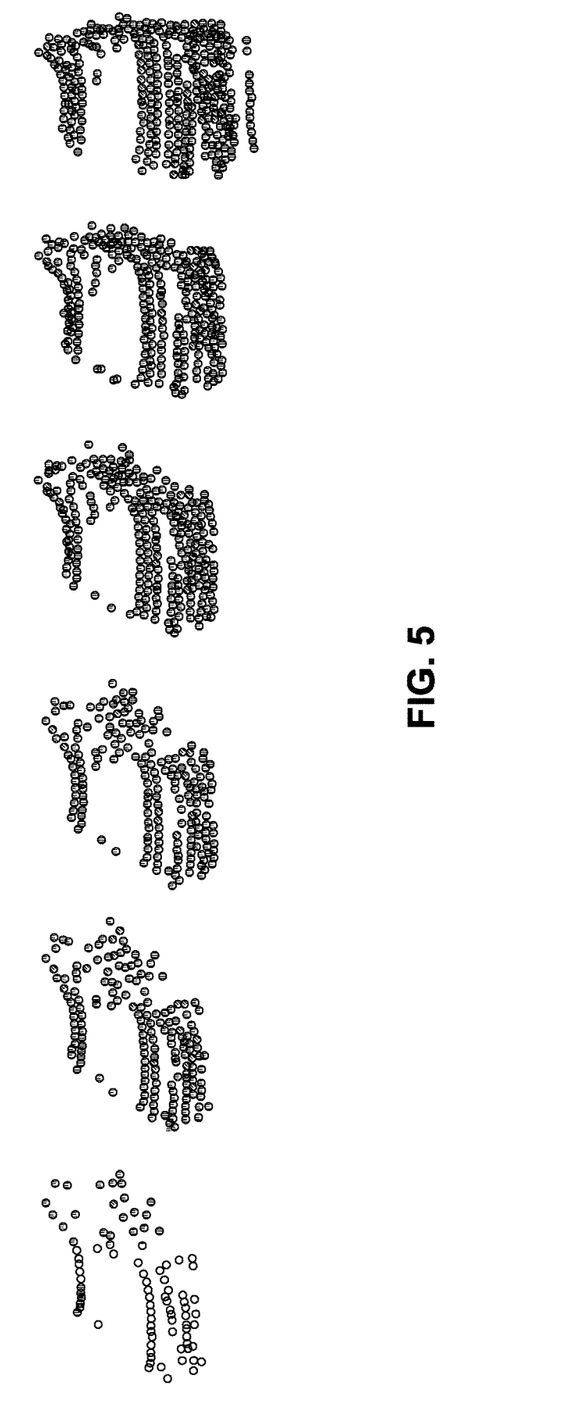
FIG. 5 is a sequence of point cloud aggregation over 6 frames.

At action 314, the processing system 102 aggregates the current point cloud with the transformed point cloud to generate an aggregated point cloud. FIG. 5 shows a sequence of point cloud aggregation over 6 frames.

At action 318, the processing system 102 optionally selects a first set of the points in the aggregated point cloud to keep for future interactions based on a weighted scoring of each point in the aggregated point cloud and selects a second set of points in the aggregated point cloud to remove based on the weighted scoring. The processing system 102 then generates a reduced (or filtered) aggregated point cloud by selectively removing the points in the second set of the points from the aggregated point cloud based on the weighted scoring of each point in the aggregated point cloud.

The weighted scoring may be based on time. For example, the weighted scoring may be based a time since each point was initially detected and a time decay function so that older points are slowly removed over time. In some embodiments, generating the reduced aggregated point cloud comprises assigning a weighted scoring of each point in the aggregated point cloud based on a time at which the respective point was initially detected and a time decay function that reduces the assigned weight based on a time lapsed since the respective point was initially detected. The points in the aggregated point cloud having a weighted scoring below a threshold are removed.

Alternatively, the weighted scoring may be based on distance. For example, the weighted scoring may be based on a distance from the centre of the origin of the aggregated point cloud (i.e., center of gravity of the vehicle 105) and a threshold distance so that points farther away from the vehicle 105 are slowly removed as the vehicle 105 moves away from the point (i.e., the farthest points are removed).

In some embodiments, generating the reduced aggregated point cloud comprises assigning the weighted scoring of each point in the aggregated point cloud based on a distance from a centre of the origin of the aggregated point cloud and a decay function that reduces the assigned weight based. The points in the aggregated point cloud having a weighted scoring below a threshold are removed.

Alternatively, the weighted scoring may be based on both time and distance.

Although there are benefits from densifying the point cloud and/or expanding the size of the point cloud based on objects that are no longer in the field of view of the DAR unit 114, when the object is too far away from the current location of the vehicle 105 (which may be measured by time and/or distance) the benefits are fewer or non-existent and may actually hinder performance due to processing delays caused by the additional processing required to maintain an ever-growing data set. The weighting used in the generation of the reduced aggregate point cloud seeks to strike a balance between the benefits and costs of maintaining the larger data set.

The processing system 102 may also filter the aggregated point cloud to reduce noise. For example, 3D coordinate data for an object belong a size threshold may be removed as noise or extraneous objects. The size threshold represents a threshold below which objects are not of interest (e.g., dust, precipitation, etc.).

The reduction or filtering of the aggregated point cloud keeps the points in the aggregated point cloud relevant. The maintenance of relevant points in the aggregated point cloud and removing irrelevant points allows for long term point relationships to be modelled, including preserving the shape of the object as observed by the DAR unit 114 from previous viewpoints. Although not shown, it will be appreciated that when points are removed from the aggregated point cloud in action 318, corresponding 3D shape information for previously detected 3D shapes may be similarly removed or dropped.

The action 318 may be configured to maintain a point cloud having a fixed maximum size. The action 318 is sometimes referred to as point sampling. The point sampling may allow for a selection of more relevant points when used in conjunction with other machine learning techniques, for example, by using a machine learning-based system such as a neural network which, in some examples, may be a Long Short Term Memory (LSTM) network. Alternatively, this may be performed programmatically using a set of one or more pre-programmed algorithms.

Figure 4:
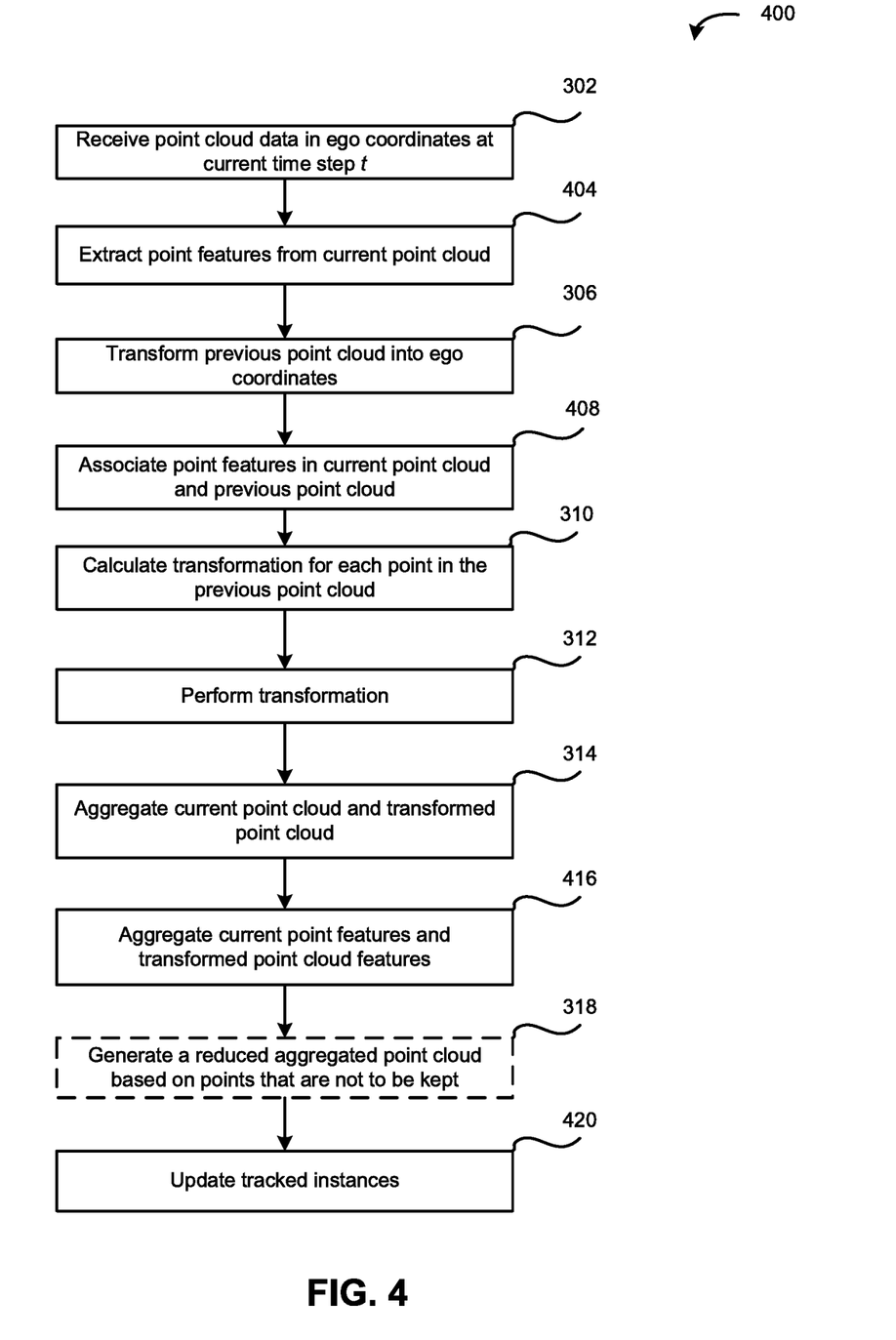
FIG. 4 is a flowchart of a method of generating augmented point cloud with point features from aggregated temporal 3D coordinate data in accordance with one example embodiment of the present disclosure.

Generating an Augmented Point Cloud with Point Features from Aggregated Temporal 3D Coordinate Data Referring to FIG. 4, a method 400 of generating an augmented point cloud with point features from aggregated temporal 3D coordinate data in accordance with one example embodiment of the present disclosure will be described. The method 400 may be carried out by software (e.g., the computer perception system 172) executed by the processor system 102 of the vehicle control system 115. Similar actions of method 300 that are part of method 400 are illustrated using the same reference numerals as in FIG. 3 and are not described in detail.

At action 302, as described above, the processor system 102 receives a current point cloud in the form of 3D coordinate data from the one or more DAR units 114 at a current time step t. The current point cloud is framed in ego coordinates.

At action 404, the processor system 102 performs point feature extraction to extract (or determine) point features from the current point cloud. This process is sometimes referred to as semantic segmentation. The extracted (or determined) point features are stored at least temporarily in memory, such as the memory 126. In some embodiments, point feature extraction may be performed using any suitable neural network configured for extracting (or determining) point features from a point cloud. An example of a suitable neural network configured for extracting (or determining) point features from a point cloud is the PointNet architecture, described in the paper Charles R. Qi, Hao Su, Kaichun Mo, Leonidas J. Guibas, "PointNet: Deep Learning on Point Sets for 3D Classification and Segmentation", CVPR 2017, 10 Apr. 2017, pages 652-660, the content of which is incorporated herein by reference. In other embodiments, point feature extraction may be performed by a machine learning-based system other than a neural network or may be performed programmatically using a set of one or more pre-programmed algorithms.

The point features are mapped to, but stored separately from, the 3D coordinate data that represents the current point cloud, for example as metadata. Each point feature is defined by a feature vector, which is an encoded representation. The point features are extracted from the 3D coordinate data that represents the current point cloud with techniques that do not require voxelization (i.e., conversion into an image).

At action 306, as described above, the processor system 102 transforms a previously generated point cloud (referred to as the "previous point cloud" for convenience), such as a previously aggregated point cloud from a previous time step t−1, into ego coordinates using the current location of the vehicle 105, which may be determined from the GPS unit 132, self-localization, or other suitable means.

At action 408, the processor system 102 performs point feature association to determine an association between point features in the current point cloud and point features in the previous point cloud, such as a previously aggregated point features from the previous time step t−1. As noted above, each feature is defined by a feature vector. In some embodiments, point feature association may be performed using any suitable a neural network configured for determining an association between point features in a current point cloud and point features in a previous point cloud. An example of a suitable neural network configured for determining an association between point features in a current point cloud and point features in a previous point cloud is the mmMOT (Multi-Modality Multi-Object Tracking) architecture, described in the paper, Wenwei Zhang, Hui Zhou, Shuyang Sun, Zhe Wang, Jianping Shi, Chen Change Loy, "Robust Multi-Modality Multi-Object Tracking", ICCV 2019, 9 Sep. 2019, pages 2365-2374, the content of which is incorporated herein by reference. In other embodiments, point feature association may be performed by a machine learning-based system other than a neural network or may be performed programmatically using a set of one or more pre-programmed algorithms.

At action 310, as described above the processing system 102 determines a transformation for each point in the previous point cloud to align the point in the previous point cloud with a corresponding point in the current point cloud. Also as described above, in some examples the transformation may be based on 3D tracking labels which are assigned to objects detected (e.g., recognized) within the point cloud using feature recognition techniques.

At action 312, as described above, the processing system 102 transforms the previous point cloud in accordance with the determined transformation to generate a transformed point cloud.

At action 314, as described above the processing system 102 aggregates the current point cloud with the transformed point cloud to generate an aggregated point cloud.

At action 416, the processing system 102 aggregates the current point features with the point features of the transformed point cloud to generate aggregated point features. As noted above, the point features are mapped to but stored separately from the 3D coordinate data that represents the aggregated 3D point cloud. The aggregated point features are similarly mapped to the aggregated point cloud and stored separately from the aggregated 3D coordinate data.

At action 318, as described above the processing system 102 optionally selects a first set of the points in the aggregated point cloud to keep for future interactions based on a weighted scoring of each point in the aggregated point cloud and selects a second set of points in the aggregated point cloud to remove based on the weighted scoring. The processing system 102 then generates a reduced (or filtered) aggregated point cloud by selectively removing the points in the selected second set of the points from the aggregated point cloud based on the weighted scoring of each point in the aggregated point cloud.

The reduction or filtering of the aggregated point cloud keeps the points and point features in the aggregated point cloud relevant. The maintenance of relevant points and point features in the aggregated point cloud and removing irrelevant points and features allows for long term point relationships to be modelled, including preserving the shape of the object as observed by the DAR unit 114 from previous viewpoints. Although not shown, it will be appreciated that when points are removed from the aggregated point cloud in action 318, the corresponding point features and 3D shape information for previously detected 3D shapes may be similarly removed or dropped.

At action 420, the processing system 102 updates one or more tracked instances using the aggregated point cloud and aggregated point features, resulting in a representation of the object taken from multiple viewpoints. An instance is a detected instance of an object in a point cloud and a tracked instance is a detected instance of a detected object that is being tracked in multiple consecutive point clouds received by a module of the computer perception system 172 such as an object tracking module, a motion prediction module, or a planning module.

The methods 300, 400 densifies points of objects in a point cloud that otherwise may be too sparse to detect by the computer perception system 172. The methods 300, 400 operate directly with previously computed point features, this allows measurements, 3D shapes defined for objects, and other point features to be preserved. In addition, the densification is based on the alignment of points in the current point cloud and a previous point cloud to reconstruct objects rather than determining missing points as in other approaches. The use of a neural network to determine a transformation for each point in a previous point cloud to align points in the previous point cloud with a corresponding points in a current point cloud is expected to be more robust than traditional methods such as iterative closet point (ICP). Furthermore, because the methods 300, 400 operate directly on point data, there are no quantization effects from voxelization and the corresponding point features may be reused over several time steps, thereby reducing or avoiding redundant calculations such as point feature extraction. Lastly, as noted above the maintenance of relevant points and features in the aggregated point cloud and removing irrelevant points and features allows for long term point relationships to be modelled, including preserving the shape of the object as observed by the DAR unit 114 from previous viewpoints.

Figure 6:
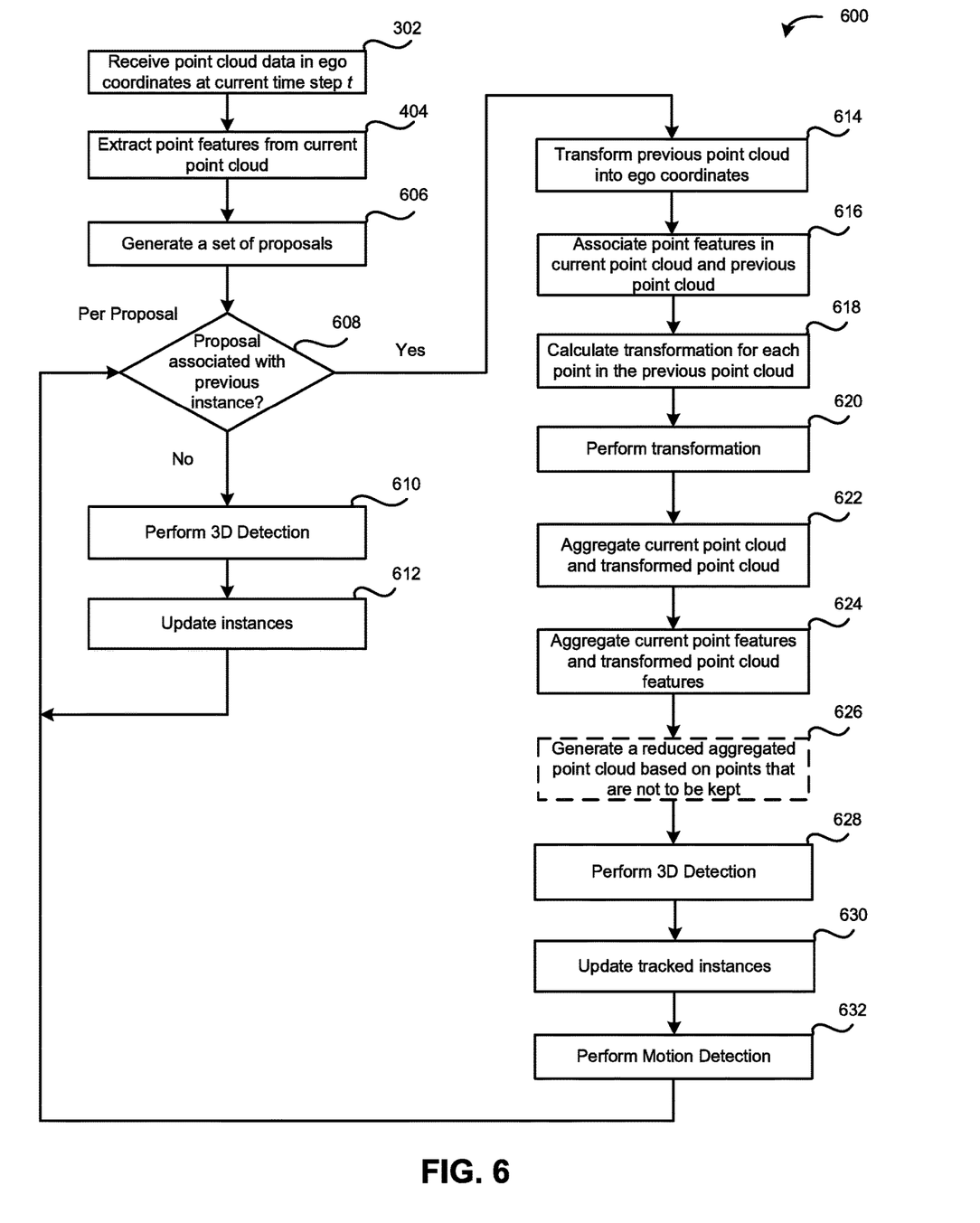
FIG. 6 is a flowchart of a method of generating an augmented point cloud with point features from aggregated temporal 3D coordinate data in accordance with another example embodiment of the present disclosure.

FIG. 6 is a flowchart of the method 600 of generating an augmented point cloud with point features from aggregated temporal 3D coordinate data in accordance with another example embodiment of the present disclosure will be described. The method 600 may be carried out by software (e.g., the computer perception system 172) executed by the processor system 102 of the vehicle control system 116. The method 600 provides a perception pipeline that includes 3D object detection, object tracking, and motion prediction and incorporates the point and point feature aggregation of the method 400 of FIG. 4.

At action 302, as described above the processor system 102 receives a current point cloud in the form of 3D coordinate data from the one or more DAR units 114 at a current time step t. The current 3D coordinate data is framed in ego coordinates.

At action 404, as described above the processor system 102 performs point feature extraction to extract (or determine) point features from the current point cloud. The extracted point features are stored at least temporarily in memory, such as the memory 126. In some embodiments, point feature extraction may be performed using any suitable a neural network configured for extracting (or determining) point features from a point cloud. An example of a suitable neural network configured for extracting (or determining) point features from a point cloud is the PointNet architecture. The point features are mapped to, but stored separately from, the 3D coordinate data, for example as metadata. In other embodiments, point feature extraction may be performed by a machine learning-based system other than a neural network or may be performed programmatically using a set of one or more pre-programmed algorithms.

At action 606, a set of proposals is generated in accordance with the extracted point features. Each proposal is a candidate region for a 3D ROI (region of interest) that represents a candidate instance. The proposals may comprise candidate 3D shapes, such as 3D tracking boxes.

At action 608, for each proposal, the processing system 102 determines whether the proposal and its points are associated with a previous instance, for example, by comparing information about detected instances and previously detected instances. The determination may be based on the Kalman Filter with Hungarian Algorithm in some embodiments. The Hungarian Algorithm is an algorithm that determines whether an object in a current time step is the same object as in a previous time step. The Kalman Filter is an algorithm that predicts future positions based on its current position. An example implementation of the Kalman Filter with Hungarian Algorithm is described in the B. Sahbani and W. Adiprawita, "Kalman filter and Iterative-Hungarian Algorithm implementation for low complexity point tracking as part of fast multiple object tracking system," 2016 6th International Conference on System Engineering and Technology (ICSET), Bandung, 2016, pp. 109-115, the content of which is incorporated herein by reference.

At action 610, in response to a determination by the processing system 102 that the proposal is not associated with a previous instance, the processing system 102 performs point-based 3D detection on the points to refine the proposals and remove overlaps, for example, using non-maximum suppression (NMS).

At action 612, similar to action 420, the processor system 102 updates the instances with the set of points and corresponding point features extracted at action 404. Updating the instances comprises saving augmented instance information such as a 3D shape (e.g., 3D box) for the tracked instance, a classification class predicted for the tracked instance, 3D coordinate data for the tracked instance, point features for the tracked instance, a trajectory for the tracked instance and a tracking history determined for the tracked instance. Table 1 below illustrates an example of data maintained for tracked instances.

TABLE 1

| Tracked Instances | | | | | | |
|---|---|---|---|---|---|---|
| ID | Box | Points | Features | Trajectory | History | Prediction |
| 1 | | | | | | |
| 2 | | | | | | |
| 3 | | | | | | |
| 4 | | | | | | |
| 5 | | | | | | |

The ID field specifies a unique ID for each tracked instance. The Box field defines a 3D bounding box for the tracked instance at the previous time step, the Points field specifies the aggregated points defining the tracked instance, the Features field specifies aggregated features corresponding to each point, the Trajectory field defines a current trajectory of the tracked instance based on past positions, the History field defines past positions of the tracked instance, Prediction field defines a predicted position of tracked instance in current and optionally one or more future time steps.

Returning to action 608, in response to a determination by the processing system that the proposal is associated with a previous tracked instance, the method proceeds to action 614. At action 614, as similar to action 306, the processor system 102 transforms a previously generated point cloud for the tracked instance, such as a previously aggregated point cloud from a previous time step t−1, into ego coordinates using the current location of the vehicle 106, which may be determined from the GPS unit 132, self-localization, or other suitable means.

At action 616, similar to action 308, the processor system 102 determines for the tracked instance an association between point features in the current point cloud and point features in the previous point cloud, such as a previously aggregated point features from the previous time step t−1.

At action 618, similar to action 310, the processing system 102 determines a transformation for each point in the previous point cloud for the tracked object to align it with the corresponding point in the previous point cloud for the tracked object with a corresponding point in the current point cloud. In some embodiments, the transformation may be determined using any suitable neural network configured for determining a transformation for each point in a point cloud for the tracked object. An example of a suitable neural network for configured for determining a transformation for each point in a point cloud for the tracked object is the FlowNet3D architecture. The input to the neural network and action 618 comprises two sets of 3D coordinate data for each point feature which is present in the both the previous point cloud and the current point cloud. The input may also comprise linking data associating the instances of each point feature in the first set of 3D coordinate data and the second set of 3D coordinate data. The first set of 3D coordinate data is the 3D coordinate data for each point in the previous point cloud in ego coordinates. The second set of 3D coordinate data is the 3D coordinate data for each point feature in the current point cloud in ego coordinates. In other embodiments, point feature extraction may be performed by a machine learning-based system other than a neural network or may be performed programmatically using a set of one or more pre-programmed algorithms.

At action 620, similar to action 312, the processing system 102 transforms the previous point cloud for the tracked instance in accordance with the determined transformation to generate a transformed point cloud for the tracked instance.

At action 622, similar to action 314, the processing system 102 aggregates the current point cloud for the tracked instance with the transformed point cloud to generate an aggregated point cloud for the tracked instance.

At action 624, similar to action 316, the processing system 102 aggregates the current point features for the tracked instance with the point features of the transformed point cloud to generate aggregated point features for the tracked instance.

At action 626, similar to action 318, the processing system 102 optionally selects a first set of the points in the aggregated point cloud for the tracked instance to keep for future interactions based on a weighted scoring of each point in the aggregated point cloud and a set of points in the aggregated point cloud to remove based on the weighted scoring. The processing system 102 then generates a reduced (or filtered) aggregated point cloud for the tracked instance by selectively removing a second set of the points from the aggregated point cloud for the tracked instance based on the weighted scoring of each point in the aggregated point cloud. for the tracked instance. The processing system 102 may also filter the aggregated point cloud to reduce noise.

At action 628, similar to action 610, the processing system 102 performs point-based 3D detection on the points of the reduced aggregated point cloud to refine the proposals based on aggregated points and features and remove overlaps, for example, using NMS.

At action 630, similar to action 612, the processing system 102 updates the one or more tracked instances using the aggregated point cloud and aggregated point features, resulting in a representation of the object taken from multiple viewpoints.

At action 632, the augmented instance information may optionally be used in motion prediction to predict object motion, which may be used to seed proposals for the next time step and guide the data association. Using the aggregated instance information (i.e., points and features), the determined point transformations, and the history of past positions, the motion of each object may be predicted for the next n frames using a suitable method such as a network with LSTMs or by the extrapolation of the current motion.

The method 600 incorporates the point and point feature aggregation into several tasks, with each task benefiting the others. The design also encourages retaining long term relationships of points and features for objects detected in point clouds through the point and feature aggregation and may be used to maintain a fixed maximum size of the point cloud due to the point sampling used to generate a reduced aggregated point cloud. Point features only need to be determined in the current time step when there is no match to a previous instance, thereby reducing the computation required to maintain an ever-growing data set.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of generating an augmented point cloud with point features from aggregated 3D coordinate data, comprising:
   receiving a current point cloud in the form of 3D coordinate data in ego coordinates captured by one or more detection and ranging (DAR) devices of a vehicle when operating in an environment;
   extracting features from the current point cloud;
   transforming a previous point cloud into ego coordinates using a current location of the vehicle;
   transforming each point in the previous point cloud to align with a corresponding point in the current point cloud to generate a transformed point cloud;
   aggregating the current point cloud with the transformed point cloud to generate an aggregated point cloud;
   aggregating the current point features with the point features of the transformed point cloud to generate aggregated point features for the aggregated point cloud; and
   generating a reduced aggregated point cloud by selectively removing a set of the points from the aggregated point cloud based on a weighted scoring of each point in the aggregated point cloud.

2. The method of claim 1, wherein generating the reduced aggregated point cloud comprises:
   assigning the weighted scoring of each point in the aggregated point cloud based on a time at which the respective point was initially detected and a time decay function that reduces the assigned weight based on a time lapsed since the respective point was initially detected; and
   removing points in the aggregated point cloud having a weighted scoring below a threshold.

3. The method of claim 1, wherein generating the reduced aggregated point cloud comprises:
   assigning the weighted scoring of each point in the aggregated point cloud based on a distance from a centre of the origin of the aggregated point cloud and a decay function that reduces the assigned weight based on the distance from the centre of the origin of the aggregated point cloud; and
   removing points in the aggregated point cloud having a weighted scoring below a threshold.

4. The method of claim 1, further comprising:
   removing point features corresponding to the set of the points selectively removed from the aggregated point cloud from the aggregated point features.

5. The method of claim 1, wherein transforming each point in the previous point cloud to align with a corresponding point in the current point cloud to generate the transformed point cloud is performed by a neural network.

6. The method of claim 1, further comprising:
   determining an association between point features in the current point cloud and point features in the previous point cloud.

7. The method of claim 6, further comprising:
   updating one or more tracked instances using the aggregated point cloud and aggregated point features using the association between point features in the current point cloud and point features in the previous point cloud.

8. The method of claim 6, wherein determining the association between point features in the current point cloud and point features in the previous point cloud is based on a Kalan Filter with Hungarian Algorithm.

9. The method of claim 6, wherein each tracked instance comprises the following instance information: a 3D shape, a classification class, 3D coordinate data, point features, a trajectory and a tracking history.

10. The method of claim 1, wherein the previous point cloud has a larger dimension that the current point cloud.

11. A non-transitory machine readable medium having tangibly stored thereon executable instructions that, in response to execution by a processing system, cause the processing system to:
   receive current point cloud in the form of 3D coordinate data in ego coordinates captured by one or more detection and ranging (DAR) devices of a vehicle when operating in an environment;
   extract features from the current point cloud;
   transform a previous point cloud into ego coordinates using a current location of the vehicle;
   transform each point in the previous point cloud to align with a corresponding point in the current point cloud to generate a transformed point cloud;
   aggregate the current point cloud with the transformed point cloud to generate an aggregated point cloud;
   aggregate the current point features with the point features of the transformed point cloud to generate aggregated point features for the aggregated point cloud; and
   generate a reduced aggregated point cloud by selectively removing a set of the points from the aggregated point cloud based on a weighted scoring of each point in the aggregated point cloud.

12. A computer perception system, comprising:
a processing system configured to:
   receive current point cloud in the form of 3D coordinate data in ego coordinates captured by one or more detection and ranging (DAR) devices of a vehicle when operating in an environment;
   extract features from the current point cloud;
   transform a previous point cloud into ego coordinates using a current location of the vehicle;
   transform each point in the previous point cloud to align with a corresponding point in the current point cloud to generate a transformed point cloud;

aggregate the current point cloud with the transformed point cloud to generate an aggregated point cloud;

aggregate the current point features with the point features of the transformed point cloud to generate aggregated point features for the aggregated point cloud; and generate a reduced aggregated point cloud by selectively removing a set of the points from the aggregated point cloud based on a weighted scoring of each point in the aggregated point cloud.

13. A method of generating an augmented point cloud, comprising:

receiving a current point cloud in the form of 3D coordinate data in ego coordinates captured by one or more detection and ranging (DAR) devices of a vehicle when the vehicle is operating in an environment;

transforming a previous point cloud into ego coordinates using a current location of the vehicle;

transforming each point in the previous point cloud to align with a corresponding point in the current point cloud to generate a transformed point cloud;

aggregating the current point cloud with the transformed point cloud to generate an aggregated point cloud; and generating a reduced aggregated point cloud by selectively removing a set of the points from the aggregated point cloud based on a weighted scoring of each point in the aggregated point cloud.

14. The method of claim 13, wherein generating the reduced aggregated point cloud comprises:

assigning the weighted scoring of each point in the aggregated point cloud based on a time at which the respective point was initially detected and a time decay function that reduces the assigned weight based on a time lapsed since the respective point was initially detected; and removing points in the aggregated point cloud having a weighted scoring below a threshold.

15. The method of claim 13, wherein generating the reduced aggregated point cloud comprises:

assigning the weighted scoring of each point in the aggregated point cloud based on a distance from a centre of the origin of the aggregated point cloud and a decay function that reduces the assigned weight based on the distance from the centre of the origin of the aggregated point cloud; and removing points in the aggregated point cloud having a weighted scoring below a threshold.

16. The method of claim 13, wherein transforming each point in the previous point cloud to align with a corresponding point in the current point cloud to generate the transformed point cloud is performed by a neural network.

17. A non-transitory machine readable medium having tangibly stored thereon executable instructions that, in response to execution by a processing system, cause the processing system to:

receive a current point cloud in the form of 3D coordinate data in ego coordinates captured by one or more detection and ranging (DAR) devices of a vehicle when the vehicle is operating in an environment;

transform a previous point cloud into ego coordinates using a current location of the vehicle;

transform each point in the previous point cloud to align with a corresponding point in the current point cloud to generate a transformed point cloud;

aggregate the current point cloud with the transformed point cloud to generate an aggregated point cloud; and generate a reduced aggregated point cloud by selectively removing a set of the points from the aggregated point cloud based on a weighted scoring of each point in the aggregated point cloud.

18. A computer perception system, comprising:

a processing system configured to:

receive a current point cloud in the form of 3D coordinate data in ego coordinates captured by one or more detection and ranging (DAR) devices of a vehicle when the vehicle is operating in an environment;

transform a previous point cloud into ego coordinates using a current location of the vehicle;

transform each point in the previous point cloud to align with a corresponding point in the current point cloud to generate a transformed point cloud;

aggregate the current point cloud with the transformed point cloud to generate an aggregated point cloud; and generate a reduced aggregated point cloud by selectively removing a set of the points from the aggregated point cloud based on a weighted scoring of each point in the aggregated point cloud.

* * * * *